United States Patent
Webster

(10) Patent No.: US 7,943,685 B2
(45) Date of Patent: May 17, 2011

(54) COMPOSITION AND METHOD FOR CURING LATEX COMPOUNDS

(75) Inventor: Carrie Ann Webster, Norwalk, CT (US)

(73) Assignee: R.T. Vanderbilt Company, Inc., Norwalk, CT (US)

( * ) Notice: Subject to any disclaimer, the term of this patent is extended or adjusted under 35 U.S.C. 154(b) by 0 days.

(21) Appl. No.: 11/278,247

(22) Filed: Mar. 31, 2006

(65) Prior Publication Data

US 2006/0235126 A1 Oct. 19, 2006

Related U.S. Application Data

(60) Provisional application No. 60/670,978, filed on Apr. 13, 2005.

(51) Int. Cl.
*C08D 243/08* (2006.01)
(52) U.S. Cl. .......................................... 524/92; 524/156
(58) Field of Classification Search .................. 524/114, 524/575.5, 156, 92; 428/500
See application file for complete search history.

(56) References Cited

U.S. PATENT DOCUMENTS

| 2,802,891 A | 8/1957 | Feild et al. |
| 3,236,799 A | 2/1966 | Bourque et al. |
| 5,855,976 A | 1/1999 | Oyama et al. |
| 6,329,444 B1 | 12/2001 | McGlothlin et al. |
| 6,391,409 B1 * | 5/2002 | Yeh et al. ..................... 428/35.7 |
| 6,569,375 B1 | 5/2003 | McGlothlin et al. |
| 2004/0071909 A1 | 4/2004 | McGlothlin et al. |
| 2004/0092684 A1 | 5/2004 | Lyons |
| 2004/0132886 A1 | 7/2004 | Tao et al. |
| 2004/0164456 A1 | 8/2004 | McGlothlin et al. |

OTHER PUBLICATIONS

Technical Data Sheet "Rhenogran ZMMBI-50", RheinChemie, version 2/18. Jan. 2005.
Material Safety Data Sheet "Butyl Zimate", R.T. Vanderbilt Company, Inc., pp. 1-6, Feb. 2005.

* cited by examiner

*Primary Examiner* — Peter D Mulcahy
(74) *Attorney, Agent, or Firm* — Norris McLaughlin & Marcus P.A.

(57) ABSTRACT

The invention pertains to a latex compound comprising a natural rubber or a synthetic rubber material and a curing system having organic peroxide. The invention also concerns a method of curing a latex film comprising the steps of forming a film from a latex compound comprising a natural rubber or synthetic rubber material and a curing system having organic peroxide and heating the film to obtain cured natural rubber or synthetic rubber materials.

10 Claims, No Drawings

COMPOSITION AND METHOD FOR CURING LATEX COMPOUNDS

CROSS-REFERENCE TO RELATED APPLICATION

This application claims the benefit of U.S. Provisional Application No. 60/670,978 filed Apr. 13, 2005, which is incorporated herein in its entirety by reference.

BACKGROUND OF THE INVENTION

1. Field of the Invention

The invention pertains to compositions comprising organic peroxide which cross-link latex films. The invention further pertains to latex compounds comprising the compositions.

2. The Related Art

Latex compounds are conventionally cured by adding sulfur, a metal oxide activator, such as zinc oxide, and a combination of accelerators. The most common accelerators used in industry are thiurams, thiazoles and dithiocarbamates. An increased number of human beings have developed skin sensitivities to the accelerators commonly found in latex goods. Thus, use of latex products cured with conventional systems has led to an increase in delayed cutaneous hypersensitivity, also known as Type IV allergy. Type IV allergy occurs when the body perceives residual chemicals in the latex products as an antigen which interacts with specific T lymphocytes that release inflammatory and toxic substances leading to a skin reaction. Persons who experience Type IV allergy generally have an increased risk of developing Type I latex allergies.

Because of the increased risk of Type IV reactions, alternative means for curing latex articles are sought in the art. Latex compounds which can be cured without conventional accelerators, such as thiurams, thiazoles and dithiocarbamates, are particularly desired. Organic peroxide is discussed in the art as a curing agent in conjunction with metal oxides. Organic peroxide curing systems in the art, however, may require special processing conditions, such as use of molten salt bath, or other liquid bath or the use of high energy radiation. Conventional organic peroxide systems do not function satisfactorily in open air systems, that is systems where the latex compounds are cured while being exposed to an external environment such as the inside of a heating chamber (oven) or ambient conditions.

Unless otherwise specified, all parts and percentages are on a weight by weight basis. Also, all parts and percentages set forth on a basis of parts per hundred rubber ("phr") are on a dry weight basis, unless otherwise specified.

SUMMARY OF THE INVENTION

The invention is a system for curing latex compounds that comprises organic peroxide, and, optionally, surfactant and/or antioxidant. The cure system can be combined with natural rubber and synthetic latex compositions, in other words a rubber material, to make latex compounds that can be cured (i.e. cross-linked) without the use of other accelerators, such as accelerators and activators used with conventional curing systems.

Latex compounds comprising the cure system can be cured in an open air environment or in closed systems. During the open air curing, the latex compounds will not become tacky, or will not obtain a level of tackiness that precludes effective open air curing. Thus, latex compounds comprising the cure system described herein require no special curing conditions, such as molten salt baths, or other liquid baths, or do not need to be cured by special curing systems like the application of radiation.

DETAILED DESCRIPTION OF THE INVENTION

The invention concerns a cure system for latex compounds. The cure system comprises organic peroxide, preferably an organic peroxide emulsion or dispersion, and, optionally, surfactant and antioxidant. In addition, the cure system may comprise coagents, and also processing aids, such as chemicals to control pH, thickeners and other materials, such as materials to reduce tackiness Curing systems comprising, consisting essentially of or consisting of one or more of organic peroxide, surfactant and antioxidant are within the scope of the invention.

Organic peroxide is a molecule containing at least two oxygen atoms connected by a single bond to organic chemical groups. An example of organic peroxide is depicted below:

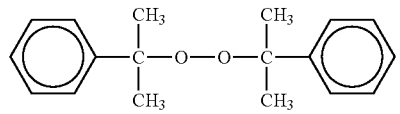

Depending on the groups attached, the oxygen-oxygen bond is designed to break when heated, leaving one unpaired electron or free radical on each oxygen. These free radicals are able to promote certain chemical reactions, such as polymerization, the curing of thermosetting resins, and the crosslinking of elastomers. As organic peroxides decompose, they generate the free radicals that in turn create an active site on the polymer backbone. When organic peroxides are used for curing latex compounds, the reaction between the active sites produces a strong carbon-carbon bond between the polymer chains in the latex, which in turn leads to a polymer network with desirable mechanical properties, in particular excellent resistance to heat.

One or a combination of organic peroxides may be used in the invention Organic peroxides such as dialkyl peroxides and peroxyketals may be used. Examples of dialkyl peroxides include those selected from the group consisting of dicumyl peroxide (such as that available from Hercules Incorporated, Wilmington, Del., USA under the trade name DICUP R), 2,5-dimethyl-di-(t-butylperoxy)hexane, di-t-butylperoxide, t-butylcumyl-peroxide, bis(t-butylperoxyisopropyl)benzene, butyl4,4-bis(t-butylperoxy)valerate, 2,5-bis(t-butylperoxy)-2,5-dimethylhexane, 2,5-bis(t-butylperoxy)-2,5-dimethyl-3-hexyne, t-butyl 3-isopropenylcumyl peroxide, bis(3-isopropenylcumyl) peroxide, 1,1-bis(t-butylperoxy)-3,3,5-trimethylcyclohexane, t-butylperoxybenzoate, and bis(2,4-dichlorobenzoyl) peroxide. Examples of organic peroxides that may be used in the invention include VAROX® 231, VAROX® DBPH, VAROX® 130 and VAROX® DCP, all available from R.T. Vanderbilt Co. Inc., Norwalk, Conn., USA ("Vanderbilt").

The organic peroxide may be in an emulsion (for liquid organic peroxides) or a dispersion (for solid organic peroxides) with water. The organic peroxide emulsion or dispersion comprises organic peroxide and water, and may consist essentially of or consist of organic peroxide and water. Generally, the emulsion or dispersion may comprise from about 10% to about 90% organic peroxide and about 10% to about 90% water, such as about 25% to about 75% organic peroxide and about 25% to about 75% water. The organic peroxide emulsion or dispersion may comprise, for example, from about 40% to about 60% organic peroxide and about 40% to about 60% water.

Surfactants useful in the invention include sodium lauryl sulfate (DARVAN® WAQ from Vanderbilt), t-Octylphenoxy-polyethoxyethanol (TRITON® X-100 from the Union Carbide Corporation, Danbury, Conn., USA) and sulfated methyl oleate (DARVAN® SMO from Vanderbilt). Ammonium salts of alkyl phosphates, such as DARVAN® L from Vanderbilt, may also be used as a surfactant. Combinations of surfactants can be used. The surfactant also assists in decreasing the surface tack during open air curing of a latex compound comprising the curing system described herein.

The cure system optionally comprises antioxidants, such as amine, dithiocarbamate, hydroquinone, phenol, or toluimidazole antioxidant. Antioxidants useful in the invention include those available from Vanderbilt under the trade names AGERITE® STALITE®, AGERITE® STALITE® S, AGERITE® SUPERFLEX® Liquid, VANOX®AM Powder, VANOX® HT, VANOX® 12, VANOX® CDPA, VANOX® 1001, BUTYL ZIMATE® Powder, AGERITE® MA Pastilles, AGERITE® RESIN DO Pastilles, AGERITE SUPERLITE®, VANOX GT Powder, VANOX® L Powder, VANOX® MBPC, VANOX® 13, VANOX® 1290, VANOX® MTI, VANOX® ZMTI and VANOX® SPL slurry. Combinations of antioxidants can be used.

The cure system may comprise one or more coagents for cross-linking the latex compounds. For example, the cure system may further comprise triallylisocyanurate ("TAIC"), such as DIAK® 7 and/or m-phenylenedimaleimide, like VANAX® MBM (1H-Pyrrole-2-5-dione, 1,1'(1,3 phenylene)bis-), both available from Vanderbilt, or Triallyl Cyanurate (SR 507 (TAC) from Sartomer, Exton, Pa., USA). Other coagents useful in the invention include Difunctional Liquid Methacrylate (SR 297 (BGDMA)), Trifunctional Liquid Methacrylate (SR 350 (TMPTMA), Scorch-Retarded Liquid Dimethacrylate (SARET® SR 516), Scorch-Retarded Liquid Trimethacrylate (SARET® SR), Scorch-Retarded Liquid Triacrylate (SARET® SR 519), Scorch-Retarded Liquid Dimethacrylate (SARET® SR 521), Scorch-Retarded Solid Diacrylate (SARET® SR 522), Scorch-Retarded Metallic Diacrylate (SARET® 75 EPM 2A (75% active dispersion), SARET® SR 633) and Scorch-Retarded Metallic Dimethacrylate (SARET® SR 634 or SARET® 75 EPM 2M (75% active dispersion)) all available from Sartomer. Combinations of coagents may be used.

The cure system may further comprise other materials. Hydroxides, such as potassium hydroxide, can be included to control pH, such as the pH of a latex compound comprising the cure system. Thickeners, such as sodium polyacrylates like Paragum-231 from Para-Chem, Simpsonville, S.C., USA, may be used in the cure system. Also, zinc 2-mercaptotoluimidazole ("ZMTI"), for example VANOX® ZMTI from Vanderbilt, may be included in the composition for tack reduction, as well as additional antioxidant protection.

The invention encompasses latex compounds comprising the cure system. In this embodiment of the invention, the latex compounds comprise, at least, organic peroxide and heat curable natural or synthetic rubber type materials, in other words a rubber material, and optionally, surfactant and/or antioxidant. The latex compounds may comprise one or more of the materials (heat curable natural or synthetic rubber) selected from the group consisting of natural rubber, polyisoprene, polychloroprene, acrylonitrile, styrene-butadiene, sulfur cured butyl, and the like, and combinations thereof. In an aspect of the invention, the rubber material is a synthetic material such as those selected from the group consisting of polychloroprene, acrylonitrile, styrene butadiene and sulfur cured butyl, and particularly chosen from the group of polychloroprene and acrylonitrile. Useful polyisoprene materials include KRATON® polymers, such as KRATON® IR-401, from the KRATON® Polymers Group of Companies having offices in Houston, Tex., USA. Neoprene Liquid Dispersion, a polychloroprene from DuPont Performance Elastomers, Wilmington, Del., USA may be used. Useful acrylonitriles include carboxylated butadiene-acrylonitrile latexes such as TYLAC® 68073 from Dow-Reichhold Specialty Latex, LLC, Research Triangle Park, N.C., USA. HYCAR® acrylic emulsions available from NOVEON®, Inc., Cleveland, Ohio, USA may also be used in the latex compounds. Natural rubber latex is available from Getahindus (M) Sdn Bdh, Selangor Darul Ehsan, Malaysia, and also from Firestone Polymers, Akron, Ohio, USA.

In an embodiment of the invention, the latex compounds comprise from about 0.1 to about 5.0 phr organic peroxide, up to about 5.0 phr, such as about 0.1 phr to about 5 phr surfactant and up to about 5.0 phr, such as about 0.1 phr to about 5 phr antioxidant. Additionally, the latex compounds may comprise up to about 5.0 phr, such as about 0.1 phr to about 5 phr ZMTI. The latex compounds may comprise from about 0.1 to about 3 phr, preferably about 0.5 phr to 2 phr, organic peroxide. The organic peroxide may be added to the latex compound in an emulsion or dispersion with water. Coagents, such as TAIC and m-phenylenediamaleimide, may be used in amounts of up to about 5 phr, for example, from about 0.75 phr to about 3.75 phr. In an aspect of the invention, the latex compound is formulated and cured without the use of metal oxide, such as zinc oxide.

A small amount of sulfur in the latex compounds may be used in or with the cure system, such as from about 0.05 phr to about 1 phr, preferably about 0.1 phr to about 0.5 phr sulfur. The sulfur is found to provide further assistance with tack reduction.

The invention also concerns a method of curing a latex film from the latex compounds of the invention comprising the steps of forming a film from a latex compound comprising the cure system, i.e., at least the organic peroxide, and, optionally, surfactant and/or antioxidant, and heating the film for a period of time. The films should be cured according to the peroxide half-life time and temperature. The half-life time of the peroxide refers to the time or temperature at which 50% of the peroxide has decomposed. In the invention, the films of the latex compounds may be cured for about 6 peroxide half-lifes to about 10 peroxide half-lifes to effectively cure or cross-link the latex compound, such that, in the curing cycle about 97% to about 100%, such as about 98.4% to about 99.9%, of the peroxide has decomposed. For example, the latex compound may be cured for about 5 minutes to about 50 minutes at about 90° C. to about 180° C., such as about 10 minutes to about 40 minutes at about 100° C. to about 175° C. In an embodiment of the invention, the film is cured for about 10 minutes to about 30 minutes at about 130° C. to about 160° C., preferably at about 140° to about 150° C.

The latex is preferably cured in an open air system, that is the curing may occur such that the latex is exposed to air when it is cured. The organic peroxide, with the surfactant, particularly the sodium lauryl sulfate and sulfated methyl oleate, combined with the ZMTI, were found as beneficial to minimize tackiness during the open air curing cycle, although other combinations of compounds within the scope of the invention also minimize tackiness in the open air cycle.

In the curing process, the organic peroxides form carbon to carbon bonds between individual polymer chains in the latex compound. The carbon to carbon bond is stronger and more thermally stable than the sulfur to sulfur bonds formed by elemental sulfur vulcanization. The use of a sulfur donor system to cure latex compounds will primarily form carbon to sulfur type bonds, the thermal stability of which falls between that of sulfur to sulfur and carbon to carbon bonds. The higher strength of the covalent carbon to carbon bond network obtained through curing with the organic peroxide results in optimum thermal stability in the cured latex compound which is beneficial to cured latex products made from latex compounds cured with organic peroxides in accordance with the invention. One aspect of the invention is a curing system which creates carbon-carbon cross link bonds without establishing any carbon-sulfur or sulfur-sulfur cross links in the cured latex compound.

The latex compounds can be used to make a wide variety of cured latex products. Examples of products that may be made with the latex compounds of the invention are gloves, condoms, carpet backing, threads and adhesives.

EXAMPLES

In the examples the degree of surface tack (i.e. tackiness) of films made from the various latex compounds was determined. The test involved a person touching the cured films and then evaluating the degree of surface tack based on a sliding scale of 1 to 5. The criteria for the sliding scale was as follows: 1 indicating no tack or a degree of surface tack generally found with articles subjected to conventional sulfur cure, 3 indicating a degree of surface tack that was sticky but did not render the file unusable, and 5 indicating a degree of surface tack rendering the films unusable. The degree of surface tack is set forth below in each example.

Examples 1A, 1B, 1C

Synthetic carboxylated butadiene-acrylonitrile latex compounds having the compositions set forth in Table 1 were formulated by methods known in the art. All components set forth in Table 1 are reported as phr. The wet formulation of these examples (i.e. after water is added) include the thickener (Paragum-231 from Para-Chem) in an amount of 2.84 phr (wet). The potassium hydroxide was from Mallinckrodt Chemicals of Mallinckrodt Baker, Inc. ("Mallinckrodt"), Phillipsburg, N.J., USA.

Films made from the latex compound of Examples 1A and 1B were cured for 30 minutes at 120° C. after drying at room temperature, and the film made from the latex compound of 1C was cured for 40 minutes at 120° C. The tensile at maximum load, strain at maximum load, 300% modulus and 500% modulus of one or more samples of the cured films were tested in accordance with ASTM Test Method D412-98a (2002) e1 "Standard Test Methods for Vulcanized Rubber and Thermoplastic Elastomer—Tension" which is incorporated herein by reference in its entirety. The average test results are set forth in Table 2. Also, the degree of surface tack was determined in accordance with the procedure discussed above and those results are set forth in Table 2.

TABLE 1

| Components | Example 1A | Example 1B | Example 1C | Ingredient Supplier or Tradename |
|---|---|---|---|---|
| Carboxylated Butadiene Acrylonitrile | 100 | 100 | 100 | HYCAR ® 1570 x 79 |
| Sodium lauryl sulfate | 1 | 1 | 1 | DARVAN ® WAQ |
| Blend of phenolic AO and ZMTI | 2 | 2 | 2 | VANOX ® SPL Slurry |
| Methyl Oleate Salt | 0.5 | .05 | 0.5 | DARVAN ® SMO |
| Potassium Hydroxide | 1 | 1 | 1 | Mallinckrodt |
| Organic Peroxide | 1 | 2 | 2 | VAROX ® 231 |

TABLE 2

| | Results | | |
|---|---|---|---|
| Test Applied | Example 1A | Example 1B | Example 1C |
| Tensile at Max Load, MPa | 8.52 | 10.08 | 13.22 |
| Strain at Max Load, % | 880.52 | 868.82 | 863.79 |
| 300% Modulus, MPa | 1.55 | 1.65 | 1.84 |
| 500% Modulus, MPa | 1.99 | 2.22 | 2.57 |
| Degree of Surface Tack | 1 | 1 | 1 |

Example 1D

A synthetic carboxylated butadiene-acrylonitrile latex compound having the composition set forth in Table 1A was formulated by methods known in the art. All components set forth in Table 1A are reported as phr. The wet formulation of this example (i.e. after water is added) includes the Paragum-231 thickener in an amount of 2.84 phr (wet).

A film made from the latex compound of Example 1D was cured for 30 minutes at 120° C. after drying at room temperature. The tensile at maximum load, strain at maximum load, 300% modulus and 500% modulus of one or more samples of the cured film were tested in accordance with ASTM Test Method D412-98a (2002) e1. The average test results are set forth in Table 2A. Also, the degree of surface tack was determined in accordance with the procedure set forth above and the result is presented in Table 2A.

TABLE 1A

| Components | EXAMPLE 1D | Ingredient Supplier or Tradename |
|---|---|---|
| Carboxylated Butadiene Acrylonitrile | 100 | HYCAR ® 1570 x 79 |
| Sodium lauryl sulfate | 1 | DARVAN ® WAQ |
| Blend of phenolic AO and ZMTI | 2 | VANOX ® SPL Slurry |
| Methyl Oleate Salt | 0.5 | DARVAN ® SMO |
| Potassium Hydroxide | 1 | Mallinckrodt |
| Organic Peroxide | 1 | VAROX ® DBPH |

TABLE 2A

| Test Applied | Results Example 1D |
|---|---|
| Tensile at Max Load, MPa | 9.18 |
| Strain at Max Load, % | 873.57 |
| 300% Modulus, MPa | 1.65 |
| 500% Modulus, MPa | 2.15 |
| Degree of SurfaceTack | 1 |

Example 1E

A synthetic carboxylated butadiene-acrylonitrile latex compound having the composition set forth in Table 1B was formulated by methods known in the art. All components set forth in Table 1B are reported as phr. The wet formulation of this example (i.e. after water is added) includes the Paragum-231 thickener in an amount of 2.84 phr (wet).

A film made from the latex compound of Example 1E was cured for 30 minutes at 140° C. after drying at room temperature. The tensile at maximum load, strain at maximum load, 300% modulus and 500% modulus of one or more samples of the cured film were tested in accordance with ASTM Test Method D412-98a (2002) e1. The average test results are set forth in Table 2B. Also, the degree of surface tack was determined in accordance with the procedure set forth above and the result is presented in Table 2B.

TABLE 1B

| Components | Example 1E | Ingredient Supplier or Tradename |
|---|---|---|
| Carboxylated Butadiene Acrylonitrile | 100 | HYCAR ® 1570 x 79 |
| Sodium lauryl sulfate | 1 | DARVAN ® WAQ |
| Blend of phenolic AO and ZMTI | 2 | VANOX ® SPL Slurry |
| Potassium Hydroxide | 0.5 | Mallinckrodt |
| Methyl Oleate Salt | 1 | DARVAN ® SMO |
| Alkyl Phosphate Salt | 0.5 | DARVAN ® L |
| Zinc 2-mercaptotoluimidazole | 1 | VANOX ® ZMTI |
| Organic Peroxide | 1 | VAROX ® 231 (50% emulsion) |

TABLE 2B

| Test Applied | Results Example 1E |
|---|---|
| Tensile at Max Load, MPa | 7.43 |
| Strain at Max Load, % | 753 |
| 300% Modulus, MPa | 2.27 |
| 500% Modulus, MPa | 2.98 |
| Degree of Surface Tack | 1 |

Example 1F

A synthetic carboxylated butadiene-acrylonitrile latex compound having the composition set forth in Table 1C was formulated by methods known in the art. All components set forth in Table 1C are reported as phr. The wet formulation of this example (i.e. after water is added) includes the Paragum-231 thickener in an amount of 2.84 phr (wet).

A film made from the latex compound of Example 1F was cured for 15 minutes at 150° C. after drying at room temperature. The tensile at maximum load, strain at maximum load, 300% modulus and 500% modulus of one or more samples of the cured film were tested in accordance with ASTM Test Method D412-98a (2002) e1. The average test results are set forth in Table 2C. Also, the degree of surface tack was determined in accordance with the procedure set forth above and the result is presented in Table 2C.

TABLE 1C

| Components | Example 1F | Ingredient Supplier or Tradename |
|---|---|---|
| Carboxylated Butadiene Acrylonitrile | 100 | HYCAR ® 1570 x 79 |
| Sodium lauryl sulfate | 1 | DARVAN ® WAQ |
| Zinc 2-mercaptotoluimidazole | 2 | VANOX ® SPL Slurry |
| m-phenylenedimaleimide | 1 | VANAX ® MBM |
| Potassium Hydroxide | 1 | Mallinckrodt |
| Organic Peroxide | 1 | VAROX ® 231 (50% emulsion) |

TABLE 2C

| Test Applied | Results Example 1F |
|---|---|
| Tensile at Max Load, MPa | 12.83 |
| Strain at Max Load, % | 771.19 |
| 300% Modulus, MPa | 1.74 |
| 500% Modulus, MPa | 2.88 |
| Degree of Surface Tack | 1 |

Examples 2 and 3

Natural latex rubber compounds having the compositions set forth in Table 3 were formulated by methods known in the art. All components set forth in Table 3 are reported as phr. Example 3 is a comparative example which includes sulfur, zinc oxide and zinc dibutyldithiocarbamate as a curing system. Zinc oxide is generally available from Zinc Corporation of America, Monaca, Pa., USA, and sulfur is generally available from R.E. Carroll Inc., Trenton, N.J., USA.

Films having thicknesses of about 10 mils to about 40 mils were made from compounds of Examples 2 and 3. Films made from these latex compounds were cured for 10 minutes at 150° C., and a film made from Example 2 was cured for 20 minutes at 100° C. Some or all of the tensile strength, tensile at maximum load, elongation, strain at maximum load, 300% modulus and 500% modulus of one or more samples of each cured film were tested applying ASTM Test Method D412-98a (2002) e1. The average test results are set forth in Table 4. Also, the degree of surface tack was determined in accordance with the procedures set forth above and the results are presented in Table 4.

TABLE 3

| Components | Example 2 | Example 3 | Ingredient Supplier or Tradename |
|---|---|---|---|
| Natural Rubber Latex | 100 | 100 | Getahindus (M) Sdn Bhd |
| Sodium lauryl sulfate | 1 | 1 | DARVAN ® WAQ |
| Methyl Oleate Salt | 0.5 | 0.5 | DARVAN ® SMO |
| Potassium Hydroxide | 0.5 | 0.5 | Mallinckrodt |
| Organic Peroxide | 1 | — | VAROX ® 231 (50% emulsion) |
| Blend of phenolic AO and ZMTI | 2 | 2 | VANOX ® SPL Slurry |
| Sulfur | — | 2 | Various |
| Zinc Oxide | — | 0.5 | Various |
| Zinc dibutyldithiocarbamate | — | 1 | BUTYL ZIMATE ® |

TABLE 4

| Test Applied | 2 (Cured at 150° C.) | 2 (Cured at 100° C.) | 3 |
|---|---|---|---|
| Tensile Strength, MPa | 19.22 | — | 30.13 |
| Tensile at Max Load, MPa | 19.22 | 5.37 | 31.50 |
| Elong., % | 896.95 | — | 886.83 |
| Strain at Max Load, % | 896.95 | 847.47 | 886.54 |
| 300% Modulus, MPa | 1.07 | 0.75 | 1.56 |
| 500% Modulus, MPa | 1.70 | 1.06 | 2.40 |
| Degree of Surface Tack | 3 | 3 | 1 |

Examples 4-6

Natural latex rubber compounds having the compositions set forth in Table 5 were formulated by methods known in the art. All components set forth in Table 5 are reported as phr.

Films having thicknesses of about 10 mils to about 40 mils made from compounds of Examples 4-6 were cured for 10 minutes at 150° C. Some or all of the tensile strength, tensile at maximum load, elongation, strain at maximum load, 300% modulus and 500% modulus of one or more samples of each cured film were tested applying ASTM Test Method D412-98a (2002) e1. The average test results are set forth in Table 6. Also, the degree of surface tack was determined in accordance with the procedure set forth above and the results are presented in Table 6.

TABLE 5

| Components | 4 | 5 | 5A | 6 | Ingredient Supplier or Tradename |
|---|---|---|---|---|---|
| Natural Rubber Latex | 100 | 100 | 100 | 100 | Getahindus (M) Sdn Bhd |
| Sodium lauryl sulfate | 1 | 1 | 1 | 1 | DARVAN ® WAQ |
| Methyl Oleate Salt | 1 | 1 | 0.5 | 1 | DARVAN ® SMO |
| Potassium Hydroxide | 0.5 | 0.5 | 0.5 | 0.5 | Mallinckrodt |
| Organic Peroxide | 1 | 1 | 1 | 1 | VAROX ® 231 (50% emulsion) |
| Blend of phenolic AO and ZMTI | 2 | 2 | 2 | 2 | VANOX ® SPL Slurry |
| Sulfur | — | — | — | 0.1 | Various |
| Alkyl Phosphate salt | 0.5 | 0.5 | 0.5 | — | DARVAN ® L |
| Zinc 2-mercaptotoluimidazole | — | 1 | 1 | 1 | VANOX ® ZMTI |

TABLE 6

| Test Applied | 4 | 5 | 5A | 6 |
|---|---|---|---|---|
| Tensile Strength, MPa | 13.11 | 10.19 | — | 14.32 |
| Tensile at Max Load, MPa | 13.11 | 13.92 | 10.21 | 14.32 |
| Elong., % | 861.46 | 862.40 | — | 880.69 |
| Strain at Max Load, % | 861.46 | 861.68 | 833.57 | 880.69 |
| 300% Modulus, MPa | 0.88 | 0.81 | 0.88 | 0.88 |
| 500% Modulus, MPa | 1.34 | 1.26 | 1.31 | 1.36 |
| Degree of Tackiness | 3 | 3 | 3 | 3 |

Examples 7-11

Neoprene 750 Liquid Dispersion compounds having the compositions set forth in Table 7 were formulated by methods known in the art. All components set forth in Table 7 are reported as phr. The wet formulation of these examples (i.e. after water is added) includes the Paragum-231 thickener in an amount of 2.3 phr (wet).

Films having thicknesses of about 10 mils to about 40 mils made from compounds of Examples 7-11 were cured for 10 minutes at 150° C. The tensile strength, tensile at maximum load, elongation, strain at maximum load, 300% modulus and 500% modulus of one or more samples of each cured film were tested applying ASTM Test Method D412-98a (2002) e1. The average test results are set forth in Table 8. Also, the degree of surface tack was determined in accordance with the procedure set forth above and the results are presented in Table 8.

TABLE 7

| Components | Example 7 | 8 | 9 | 10 | 11 | Ingredient Supplier or Tradename |
|---|---|---|---|---|---|---|
| Neoprene | 100 | 100 | 100 | 100 | 100 | Dupont-Dow Elastomers |
| Sodium lauryl sulfate | 1 | 1 | 1 | 1 | 1 | DARVAN ® WAQ |
| Methyl Oleate Salt | 1 | 0.5 | 1 | 0.5 | 1 | DARVAN ® SMO |
| Potassium Hydroxide | 1 | 1 | 1 | 1 | 1 | Mallinckrodt |
| Organic Peroxide | 1 | 1 | 1 | 1 | 1 | VAROX ® 231 (50% emulsion) |
| Blend of phenolic AO and ZMTI | 2 | 2 | 2 | 2 | 2 | VANOX ® SPL Slurry |
| Sulfur | 0.1 | — | — | 0.1 | 0.1 | Various |
| Alkyl Phosphate salt | — | 0.5 | 0.5 | 0.5 | 0.5 | DARVAN ® L |
| Zinc 2-mercaptotoluimidazole | 1 | 1 | — | 1 | 1 | VANOX ® ZMTI |

TABLE 8

| Test Applied | Results Example 7 | 8 | 9 | 10 | 11 |
|---|---|---|---|---|---|
| Tensile Strength, MPa | 18.98 | 16.33 | 13.00 | 18.24 | 15.57 |
| Tensile at Max Load, MPa | 22.21 | 16.33 | 13.01 | 18.24 | 15.57 |
| Elong., % | 927.05 | 990.15 | 1000.66 | 973.46 | 971.47 |
| Strain at Max Load, % | 926.71 | 990.15 | 1000.66 | 973.46 | 971.47 |
| 300% Modulus, MPa | 1.63 | 1.46 | 1.30 | 1.52 | 1.57 |
| 500% Modulus, MPa | 2.39 | 1.95 | 1.71 | 1.99 | 2.16 |
| Degree of Surface Tack | 1 | 1 | 1 | 1 | 1 |

Examples 12-16

Latex compounds of Neoprene 750 Liquid Dispersion having the compositions set forth in Table 9 were formulated by methods known in the art. All components set forth in Table 9 are reported as phr. The wet formulation of these examples (i.e. after water is added) includes the Paragum-231 thickener in an amount of 2.3 phr (wet).

Films having thicknesses of about 10 mils to about 40 mils made from compounds of Examples 12-16 were subjected to two separate curing conditions. Samples of the films were cured for 10 minutes at 150° C., and other samples of the films were cured for 30 minutes at 140° C. The tensile strength, tensile at maximum load, elongation, strain at maximum load, 300% modulus and 500% modulus of one or more samples of each film cured under the two conditions were tested applying ASTM Test Method D412-98a (2002) e1. The average test results for the samples cured for 10 minutes at 150° C. are set forth in Table 10, and the average test results for the samples cured for 30 minutes at 140° C. are set forth in Table 11. Also, the degree of surface tack was determined in accordance with the procedure set forth above and the results are presented in Tables 10 and 11.

TABLE 9

| Components | Example 12 | 13 | 14 | 15 | 16 | Ingredient Supplier or Tradename |
|---|---|---|---|---|---|---|
| Neoprene | 100 | 100 | 100 | 100 | 100 | DuPont Performance Elastomers |
| Sodium lauryl sulfate | 1 | 1 | 1 | 1 | 1 | DARVAN ® WAQ |
| Methyl Oleate Salt | 1 | 1 | 1 | 1 | 1 | DARVAN ® SMO |
| Potassium Hydroxide | 1 | 1 | 1 | 1 | 1 | Mallinckrodt |
| Organic Peroxide | 1 | 2 | 3 | 4 | 5 | VAROX ® 231 (50% emulsion) |
| Blend of phenolic AO and ZMTI | 2 | 2 | 2 | 2 | 2 | VANOX ® SPL Slurry |
| Sulfur | 0.1 | 0.1 | 0.1 | 0.1 | 0.1 | Various |
| TAIC (Coagent) | 0.75 | 1.50 | 2.25 | 3.00 | 3.75 | DIAK ® 7 |
| Zinc 2-mercaptotoluimidazole | 1 | 1 | 1 | 1 | 1 | VANOX ® ZMTI |

TABLE 10

| Test Applied | Results Example | | | | |
|---|---|---|---|---|---|
| | 12 | 13 | 14 | 15 | 16 |
| Tensile Strength, MPa | 15.42 | 20.01 | 22.75 | 18.48 | 16.15 |
| Tensile at Max Load, MPa | 15.42 | 21.14 | 22.75 | 18.48 | 18.44 |
| Elong., % | 909.06 | 901.52 | 883.07 | 769.00 | 729.16 |
| Strain at Max Load, % | 909.06 | 901.18 | 882.82 | 769.00 | 728.91 |
| 300% Modulus, MPa | 1.45 | 1.55 | 1.60 | 1.81 | 1.84 |
| 500% Modulus, MPa | 2.88 | 2.18 | 2.41 | 3.08 | 3.48 |
| Degree of Surface Tack | 1 | 1 | 1 | 1 | 1 |

TABLE 11

| Test Applied | Results Example | | | | |
|---|---|---|---|---|---|
| | 12 | 13 | 14 | 15 | 16 |
| Tensile Strength, MPa | 23.88 | 28.72 | 19.93 | 17.21 | 23.14 |
| Tensile at Max Load, MPa | 23.88 | 28.72 | 19.93 | 18.75 | 23.14 |
| Elong., % | 917.97 | 908.35 | 798.21 | 705.45 | 825.77 |
| Strain at Max Load, % | 917.97 | 908.35 | 798.21 | 705.02 | 825.77 |
| 300% Modulus, MPa | 1.46 | 1.69 | 1.71 | 2.06 | 1.67 |
| 500% Modulus, MPa | 2.06 | 2.48 | 2.80 | 4.01 | 2.87 |
| Degree of Surface Tack | 1 | 1 | 1 | 1 | 1 |

Examples 17-21

Latex compounds of Neoprene 750 Liquid Dispersion having the compositions set forth in Table 12 were formulated by methods known in the art. All components set forth in Table 12 are reported as phr. The wet formulation of these examples (i.e. after water is added) includes the Paragum-231 thickener in an amount of 2.3 phr (wet).

Films having thicknesses of about 10 mils to about 40 mils made from compounds of Examples 17-21 were subjected to two separate curing conditions. Samples of the films were cured for 10 minutes at 150° C., and other samples of the films were cured for 30 minutes at 140° C. The tensile at maximum load, strain at maximum load, 300% modulus and 500% modulus of one or more samples of each film cured under the two conditions were tested applying ASTM Test Method D412-98a (2002) e1. The average test results for the samples cured for 10 minutes at 150° C. are set forth in Table 13, and the average test results for the samples cured for 30 minutes at 140° C. are set forth in Table 14. Also, the degree of surface tack was determined in accordance with the procedure set forth above and the results are presented in Tables 13 and 14.

TABLE 12

| Components | Example | | | | | Ingredient Supplier or Tradename |
|---|---|---|---|---|---|---|
| | 17 | 18 | 19 | 20 | 21 | |
| Neoprene | 100 | 100 | 100 | 100 | 100 | DuPont Performance Elastomers |
| Sodium lauryl sulfate | 1 | 1 | 1 | 1 | 1 | DARVAN ® WAQ |
| Methyl Oleate Salt | 1 | 1 | 1 | 1 | 1 | DARVAN ® SMO |
| Potassium Hydroxide | 1 | 1 | 1 | 1 | 1 | Mallinckrodt |
| Organic Peroxide | 1 | 1 | 1 | 1 | 1 | VAROX ® 231 (50% emulsion) |
| Blend of phenolic AO and ZMTI | 2 | 2 | 2 | 2 | 2 | VANOX ® SPL Slurry |
| Sulfur | 0.1 | 0.1 | 0.1 | 0.1 | 0.1 | Various |
| TAIC (Coagent) | 0.25 | 0.5 | 0.75 | 1.00 | 1.50 | DIAK ® 7 |
| Zinc 2-mercaptotoluimidazole | 1 | 1 | 1 | 1 | 1 | VANOX ® ZMTI |

TABLE 13

| Test Applied | Results Example | | | | |
|---|---|---|---|---|---|
| | 17 | 18 | 19 | 20 | 21 |
| Tensile at Max Load, MPa | 24.55 | 18.23 | 23.47 | 18.80 | 20.82 |
| Strain at Max Load, % | 841.31 | 755.55 | 851.22 | 825.26 | 827.76 |
| 300% Modulus, MPa | 1.79 | 2.14 | 1.72 | 1.71 | 1.71 |
| 500% Modulus, MPa | 3.04 | 3.69 | 2.73 | 2.71 | 2.76 |
| Degree of Surface Tack | 1 | 1 | 1 | 1 | 1 |

TABLE 14

| Test Applied | Results Example | | | | |
|---|---|---|---|---|---|
| | 17 | 18 | 19 | 20 | 21 |
| Tensile at Max Load, MPa | 19.85 | 24.38 | 20.01 | 20.12 | 22.58 |
| Strain at Max Load, % | 774.00 | 815.44 | 764.37 | 786.19 | 799.87 |
| 300% Modulus, MPa | 2.16 | 2.11 | 2.03 | 1.96 | 1.97 |
| 500% Modulus, MPa | 3.84 | 3.76 | 3.67 | 3.31 | 3.40 |
| Degree of Surface Tack | 1 | 1 | 1 | 1 | 1 |

Examples 22-26

Neoprene 750 Liquid Dispersion compounds having the compositions set forth in Table 15 were formulated by methods known in the art. All components set forth in Table 15 are reported as phr. The wet formulation of these examples (i.e. after water is added) includes the Paragum-231 thickener in an amount of 2.3 phr (wet).

Films having thicknesses of about 10 mils to about 40 mils made from compounds of Examples 22-26 were cured for 15 minutes at 175° C. The tensile at maximum load, strain at maximum load, 300% modulus and 500% modulus of one or more samples of each cured film were tested applying ASTM Test Method D412-98a (2002) e1. The average test results are set forth in Table 16. Also, the degree of surface tack was determined in accordance with the procedure set forth above and the results are presented in Table 16.

TABLE 15

| Components | Example 22 | 23 | 24 | 25 | 26 | Ingredient Supplier or Tradename |
|---|---|---|---|---|---|---|
| Neoprene | 100 | 100 | 100 | 100 | 100 | DuPont Performance Elastomers |
| Sodium lauryl sulfate | 1 | 1 | 1 | 1 | 1 | DARVAN ® WAQ |
| Methyl Oleate Salt | 1 | 1 | 1 | 1 | 1 | DARVAN ® SMO |
| Potassium Hydroxide | 1 | 1 | 1 | 1 | 1 | Mallinckrodt |
| Organic Peroxide | 1 | 3 | 4 | 5 | 1 | VAROX ® DBPH (50% emulsion) |
| Blend of phenolic AO and ZMTI | 2 | 2 | 2 | 2 | 2 | VANOX ® SPL Slurry |
| Sulfur | 0.1 | 0.1 | 0.1 | 0.1 | 0.1 | Various |
| TAIC (Coagent) | 0.75 | 2.25 | 3.00 | 3.75 | — | DIAK ® 7 |
| Zinc 2-mercaptotoluimidazole | 1 | 1 | 1 | 1 | 1 | VANOX ® ZMTI |

TABLE 16

| | Results Example | | | | |
|---|---|---|---|---|---|
| Test Applied | 22 | 23 | 24 | 25 | 26 |
| Tensile at Max Load, MPa | 36.94 | 31.84 | 26.22 | 26.46 | 28.42 |
| Strain at Max Load, % | 796.42 | 739.17 | 698.89 | 712.62 | 712.67 |
| 300% Modulus, MPa | 2.22 | 2.14 | 2.23 | 2.24 | 2.28 |
| 500% Modulus, MPa | 4.91 | 5.74 | 6.20 | 5.80 | 5.94 |
| Degree of Surface Tack | 1 | 1 | 1 | 1 | 1 |

Examples 27-28

Natural latex rubber compounds having the compositions set forth in Table 17 were formulated by methods known in the art. All components set forth in Table 17 are reported as phr.

Films having thicknesses of about 10 mils to about 40 mils made from compounds of Examples 27-28 were cured for 12 minutes at 150° C. The tensile at maximum load, strain at maximum load, 300% modulus and 500% modulus of one or more samples of each cured film were tested applying ASTM Test Method D412-98a (2002) e1. The average test results are set forth in Table 18. Also, the degree of surface tack was determined in accordance with the procedure set forth above and the results are presented in Table 18.

TABLE 17

| | Example | | Ingredient Supplier |
|---|---|---|---|
| Components | 27 | 28 | or Tradename |
| Natural Rubber Latex | 100 | 100 | Sdn Bhd Firestone Polymers |
| Sodium lauryl sulfate | 1 | 1 | DARVAN ® WAQ |
| Methyl Oleate Salt | 1 | 1 | DARVAN ® SMO |

TABLE 17-continued

| | Example | | Ingredient Supplier |
|---|---|---|---|
| Components | 27 | 28 | or Tradename |
| Potassium Hydroxide | 1 | 1 | Mallinckrodt |
| Organic Peroxide | 3 | 5 | VAROX ® 231 (50% Emulsion) |
| Blend of phenolic AO and ZMTI | 2 | 2 | VANOX ® SPL Slurry |
| Sulfur | 0.1 | 0.1 | Various |
| Phenol AO | 1 | 1 | VANOX ® L |
| TAIC (Coagent) | 2.25 | 3.75 | DIAK ® 7 |

TABLE 18

| | Results Example | |
|---|---|---|
| Test Applied | 27 | 28 |
| Tensile at Max Load, MPa | 10.17 | 18.05 |
| Strain at Max Load, % | 751.82 | 713.24 |
| 300% Modulus, MPa | 1.01 | 1.59 |
| 500% Modulus, MPa | 1.64 | 2.95 |
| Degree of Surface Tack | 3 | 3 |

I claim:

1. A method of curing a latex film comprising the steps of forming a film from a latex compound having a rubber material and a curing system comprising organic peroxide at about 0.1 to about 5.0 phr, a combination comprising sodium lauryl sulfate and sulfated methyl oleate at about 0.1 to about 5.0 phr, and zinc 2-mercaptotoluimidazole at about 0.1 to about 5.0 phr, and heating the film for about 6 peroxide half-lives to about 10 peroxide half-lives in an open air system.

2. The method of claim 1 wherein the curing system comprises an emulsion or dispersion of organic peroxide in water comprising from about 10% to about 90% organic peroxide and about 10% to about 90% water.

3. The method of claim 1, wherein the organic peroxide is selected from the group consisting of dicumyl peroxide, 2,5-dimethyl-di-(t-butylperoxy)hexane, di-t-butylperoxide, t-butylcumyl-peroxide, bis(t-butylperoxyisopropyl)benzene, butyl4,4-bis(t-butylperoxy)valerate, 2,5-bis(t-butylperoxy)-2,5-dimethylhexane, 2,5-bis(t-butylperoxy)-2,5-dimethyl-3-hexyne, t-butyl 3-isopropenylcumyl peroxide, bis(3-isopropenylcumyl) peroxide, 1,1-bis(t-butylperoxy)-3,3,5-trimethylcyclohexane, t-butylperoxybenzoate, and bis(2,4-dichlorobenzoyl)peroxide.

4. The method of claim 1, wherein the rubber material is selected from the group consisting of natural rubber, polyisoprene, polychloroprene, acrylonitrile, styrene-butadiene, sulfur cured butyl, and combinations thereof.

5. The method of claim 1, wherein the combination further comprises ammonia salts of alkyl phosphates.

6. The method of claim 1, wherein the curing system further comprises an antioxidant.

7. The method of claim 1, wherein the curing system further comprises sulfur.

8. The method of claim 1, wherein the sodium lauryl sulfate is present at about 1.0 phr, the sulfated methyl oleate is present at about 0.5 -1.0 phr, the peroxide is present at about 1.0 phr and the zinc 2-mercaptotoluimidazole is present at about 0.3 -1.7 phr.

9. The method of claim 8, wherein the combination further comprises ammonia salts of alkyl phosphates at about 0.5 phr.

10. The method of claim 1, further comprising about 0.75 to 3.75 phr of TAIC or m-phenylenediamaleimide.

* * * * *